United States Patent
Koskela

(10) Patent No.: US 7,412,041 B2
(45) Date of Patent: Aug. 12, 2008

(54) MOBILE COMMUNICATIONS TERMINAL AND METHOD

(75) Inventor: Antti A. Koskela, Helsinki (FI)

(73) Assignee: Nokia Corporation, Espoo (FI)

( * ) Notice: Subject to any disclaimer, the term of this patent is extended or adjusted under 35 U.S.C. 154(b) by 916 days.

(21) Appl. No.: 10/913,052

(22) Filed: Aug. 5, 2004

(65) Prior Publication Data

US 2006/0029202 A1    Feb. 9, 2006

(51) Int. Cl.
*H04M 1/56* (2006.01)
*H04M 15/08* (2006.01)
*H04M 1/00* (2006.01)
*H04M 3/00* (2006.01)

(52) U.S. Cl. .............................. 379/142.05; 379/142.06; 379/373.03; 455/416

(58) Field of Classification Search ............ 379/142.01, 379/142.05, 142.06, 142.16, 142.17, 373.01, 379/373.02, 373.03, 373.04, 374.01–374.03; 455/416

See application file for complete search history.

(56) References Cited

U.S. PATENT DOCUMENTS

| 6,826,270 | B1 * | 11/2004 | Welch et al. ........... 379/142.06 |
| 2003/0202651 | A1 | 10/2003 | Nguyen et al. ............... 379/373 |
| 2006/0052091 | A1 * | 3/2006 | Onyon et al. ................. 455/415 |

FOREIGN PATENT DOCUMENTS

EP    1528775 A1    4/2005

* cited by examiner

*Primary Examiner*—Binh K Tieu
(74) *Attorney, Agent, or Firm*—Perman & Green, LLP

(57) ABSTRACT

In a telephone terminal an incoming call is detected from a calling entity followed by determining a caller identity of the calling entity. Then it is determined whether the caller identity is associated with a subscription to presence information associated with the calling entity, where the presence information includes media data for output through an output unit in the telephone terminal. If the caller identity was determined to be associated with a subscription to presence information, it is determined whether the media data is present in the terminal, and if the media data is present in the terminal, the media data is output through an output unit in the telephone terminal.

8 Claims, 3 Drawing Sheets

MOBILE COMMUNICATIONS TERMINAL AND METHOD

FIELD OF THE INVENTION

The present invention relates to a telephone terminal, a method and a computer program in a telephone terminal involving output of media data to announce an incoming call.

BACKGROUND

Mobile telephones, and the use of mobile telephones, have evolved into something more than a tool for the specific purpose of providing a simple channel of voice communication between two communicating entities. The mobile phones of today are almost as much tools for personal expression as they are communication tools. One, widely used and popular, specific way of personalizing a telephone is to enable it to reproduce ring tones that vary depending on the identity of the caller. Typically, this is achieved by way of downloading data from a provider of ring tones and then using, e.g., phone book functionality, to associate a caller identity with the ring tone. Similarly, an association between a caller identity and other media data, such as a picture, to be presented upon call reception is also widely used.

However, present day telephone functionality does not provide, in a flexible manner, a way in which any caller can express personality by having the telephone of a called party play a personal ring tone associated with the caller, irrespective of whether or not the receiving party has downloaded a specific ring tone or not.

SUMMARY OF THE INVENTION

An object of the present invention is hence to overcome drawbacks relating to lacking flexibility of prior art telephone terminals.

The object is achieved by way of a method in a telephone terminal according to claim 1, a telephone terminal according to claim 6 and a computer program according to claim 8.

A method, which preferably is realized by way of a computer program, in a telephone terminal comprises detecting an incoming call from a calling entity followed by determining a caller identity of the calling entity. Then it is determined whether the caller identity is associated with a subscription to presence information associated with the calling entity, where the presence information comprises media data for output through an output unit in the telephone terminal. If the caller identity was determined to be associated with a subscription to presence information, it is determined whether the media data is present in the terminal, and if the media data is present in the terminal, the media data is output through an output unit in the telephone terminal.

That is, the telephone of a called party will play a personal media presentation associated with the caller, which has the advantage that it provides increased flexibility for telephone users wishing to express personality when making and receiving calls.

If the caller identity was determined to be associated with a subscription to the presence information and if the media data is not present in the terminal, the media data is fetched from the presence information associated with the caller identity.

Preferably, the determining whether the caller identity is associated with a subscription to presence information comprises communication with a presence server. Also, if necessary, the fetching of media data comprises fetching data from the presence server. This is advantageous in that it is easy, and hence non-expensive, to realize, for example by way of modifying already existing presence service servers.

In a preferred embodiment, the media data comprises a ring-tone.

Other aspects of the present invention include a telephone terminal comprising means for performing the method discussed above as well as a computer program that is loadable into memory means of the terminal and, when executed, performs the method discussed above.

PREFERRED EMBODIMENTS

Figure 1:
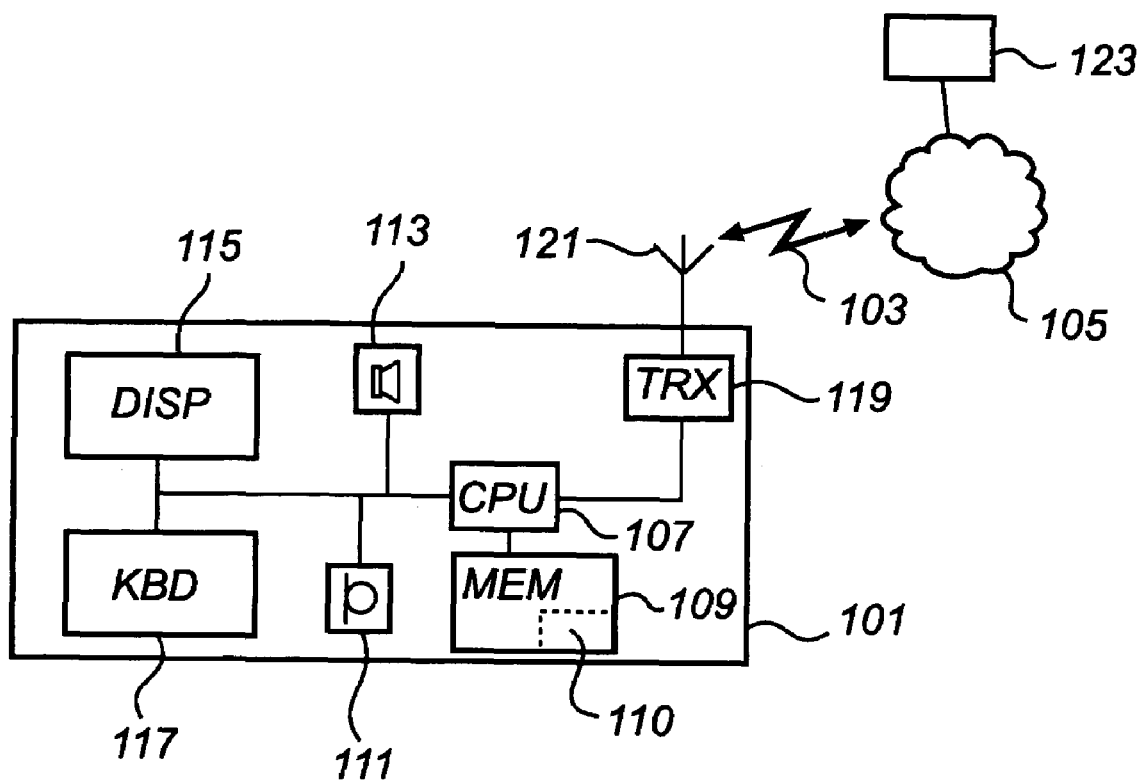
FIG. 1 shows schematically a block diagram of a mobile telephone according to the present invention.

FIG. 1 illustrates schematically a communication terminal 101 in which the present invention is implemented. The telephone 101 is capable of communication via an air interface 103 with a mobile (radio) communication system 105 such as the well known systems GSM/GPRS, UMTS, CDMA 2000 etc. The terminal comprises a processor 107, memory 109 as well as input/output units in the form of a microphone 111, a speaker 113, a display 115 and a keyboard 117. Radio communication is realized by radio circuitry 119 and an antenna 121. The details regarding how these units communicate are known to the skilled person and is therefore not discussed further. The communication terminal 101 may for example be a mobile telephone terminal or a PDA equipped with radio communication means.

The methods according to the preferred embodiments of the present invention will in general reside in the form of software instructions of a computer program 110, together with other software components necessary for the operation of the terminal 101, in the memory 109 of the terminal 101. The computer program 110, which may be loaded into the memory 109 from a software provider 123 by way of methods known to the skilled person, will be executed by the processor 107, which will receive and process input data from all other units in the terminal 101.

Figure 2:
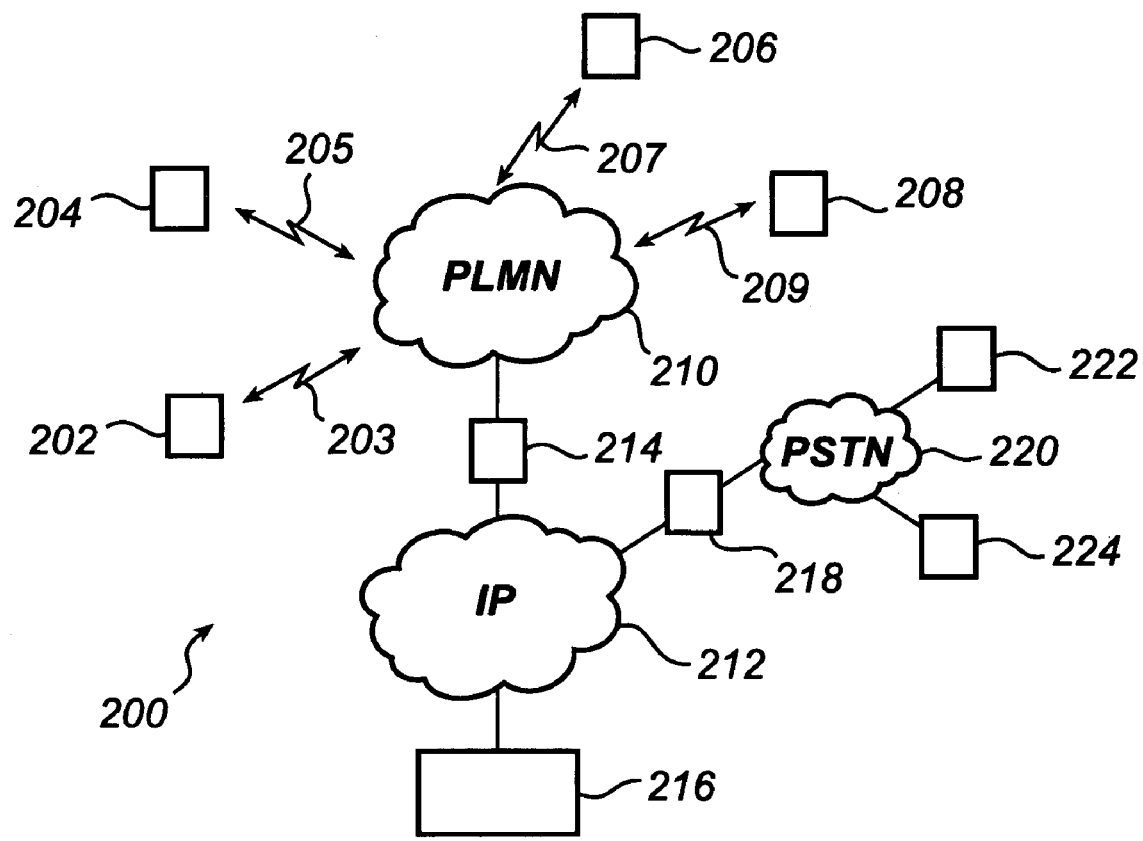
FIG. 2 shows schematically interconnected communication networks where a method according to the present invention is realized.
Figure 3:
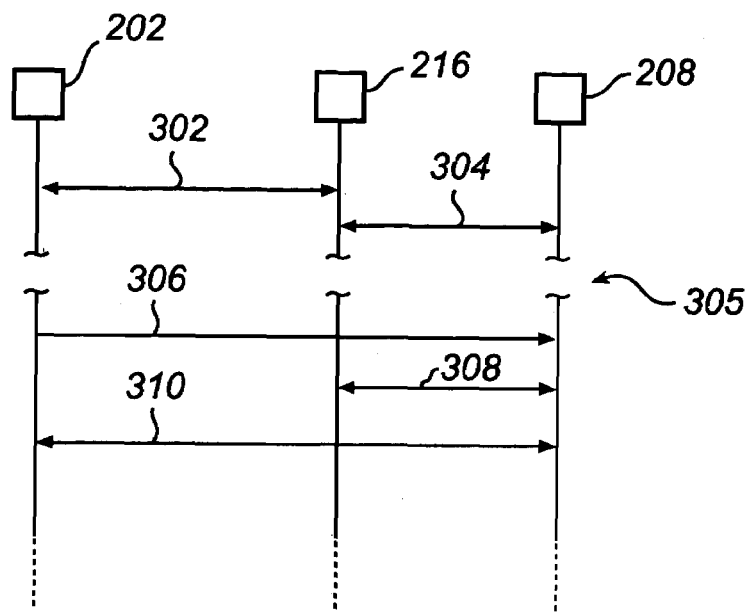
FIG. 3 is a signaling diagram illustrating a method according to the present invention.
Figure 4:
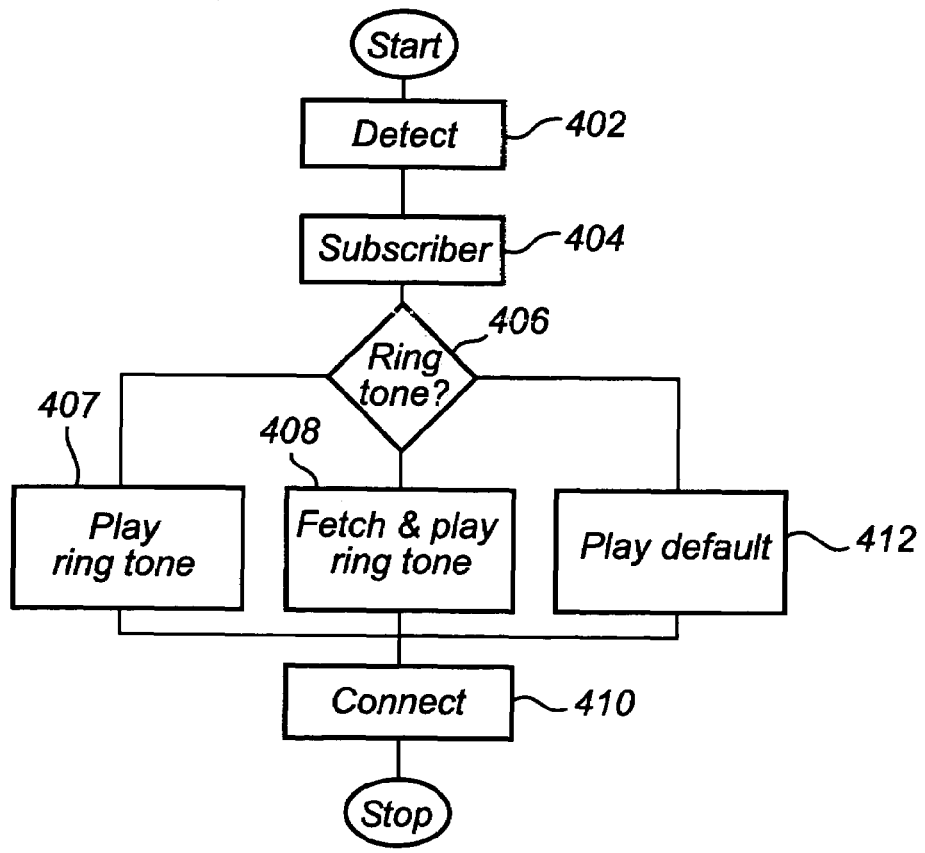
FIG. 4 is a flow chart illustrating a method according to the present invention.

Turning now to FIGS. 2, 3 and 4, a method according to the present invention will be described in some detail.

A communication system 200 in which the invention is realized is schematically illustrated in FIG. 2. A mobile communication system 210, e.g. the system 105 mentioned above, an IP communication system 212 and a telephone network 220 are interconnected via respective gateways 214 and 218. A first mobile communication terminal 202 as well as a second 204, a third 206 and a fourth mobile communication terminal 208 communicate via respective air interfaces 203, 205, 207 and 209 in the communication system 200. The mobile communication terminals 202, 204, 206 and 208 are preferably telephone terminals such as the terminal 101 described above in connection with FIG. 1.

In a similar manner to the mobile communication network 210, the telephone network 220, which typically is a fixed network such as a PSTN, enables a first subscriber unit 222 and a second subscriber unit 224 to communicate in the communication system 200.

Needless to say, the mobile communication system 210, telephone network 220 and the IP network typically comprises a very large number of connected terminals and other communicating entities, many more than the few illustrated in FIG. 2, as the skilled person realizes.

Connected to the IP network 212 is a presence server 216, which provides a presence service as specified by, e.g., the Open Mobile Alliance (OMA) IMPS and SIP/SIMPLE. The presence server 216 holds presence information associated with any number of entities, e.g. users and user communication terminals, and includes such media information as ring tones to be reproduced by loud speakers in telephone terminals when receiving incoming calls. The presence information in the form of a ring tone is typically provided to the presence server 216 by the users through uploading already existing ring tones from their terminal. However, other ways of providing ring tone data to the presence server may involve communication with providers of ring tones via, e.g., web service interfaces such as a web portal.

Turning now to FIGS. 3 and 4, a method involving ring tones will be described. The method involves a first calling entity, in the form of a first user who is in control of the first mobile communication terminal 202, calling the fourth mobile communication terminal 208 which, when detecting the call, plays a personal ring tone associated with the first user (entity). The personal ring tone is a piece of media data that forms part of presence information associated with the first entity 202 and which has been provided to the presence server 216, e.g. as discussed above, during a first signaling sequence 302.

The fourth user has, by performing a second signaling sequence 304, subscribed to at least part of the presence information associated with the first entity. During the second signaling sequence 304 information in the form of media data is loaded into the fourth terminal 208 including a personal ring tone, which is associated with the first entity. For example, using terminology of presence services, the fourth user have created or edited a "buddy list" comprising a list of users or user terminals from whom the fourth user wishes to receive a personalized ring tone. Alternatively, it is not necessary to load all media data making up the ring tone. However, at least an indication that the fourth user subscribes to the personal ring tone is loaded.

Following the two signaling sequences 302 and 304, a sequence of steps are performed which involves the first entity placing a call to the fourth entity 208. It is to be noted that the above described sequence relating to subscription to presence information may be performed at any time prior to the sequence to be described, as indicated by a gap 305 in the signaling diagram of FIG. 3.

The first mobile communication terminal 202 calls the fourth communication terminal 208 by utilizing a third signaling sequence 306. The fourth communication terminal 208 detects the call, in a call detection step 402, and continues in a subscriber determining step 404 to determine the identity of the calling entity and to determine whether the caller identity is associated with a subscription, belonging to the entity in control of the fourth communication terminal 208, to presence information associated with the calling entity. The determination of the identity and subscription status is preferably performed by way of a fourth signaling sequence 308 between the fourth communication terminal 208 and the presence server 216.

Upon determining that the entity in control of the fourth communication terminal 208 subscribes to presence information associated with the calling entity, the fourth communication terminal 208 decides in a determination step 406 whether or not to fetch media information in the form of data comprising a personal ring tone associated with the calling entity. If it is determined that the subscription includes a ring tone and that the ring tone is already present in the terminal 208, i.e. if the ring tone has already been fetched (e.g. during step 304 as described above), the ring tone is output through the speaker in the fourth communication terminal 208 in a play step 407.

A benefit gained from having down loaded the ring tone with the presence information is that as a call arrives the ring tone is already accessible and need not be downloaded as the call is being connected. Otherwise, the download might actualy in some cases take too long and the calling party might give up and hang up before the ring tone has been down loaded and played at the called party's terminal.

If it is determined that the subscription includes a ring tone and that the ring tone is not present in the terminal 208, the data of the ring tone is fetched from the presence server 216 and reproduced via a speaker in the fourth communication terminal 208 in a fetch and play step 408.

If it is determined that there is no subscription or if no ring tone is present in the presence information, no data is fetched and a default ring tone is reproduced via a speaker in the fourth communication terminal 208 in a default ring tone play step 412.

After reproducing the ring tone, the caller and the called entity establishes a connection in a connection establishing step 410.

It should be clear that the media data could also be for example a video clip that is to be played to announce an incoming call.

As the skilled person will realize, the method described above may in alternative embodiments involve other communication terminals, such as the terminals 222 and 224 connected to the telephone network 220. Similarly, other embodiments may involve a first communication terminal connected to the mobile communication system 210 and a second communication terminal connected to the telephone network 220.

The invention claimed is:

1. A method in a telephone terminal, comprising:
   detecting an incoming call from a calling entity,
   determining a caller identity of the calling entity,
   determining whether the caller identity is associated with a subscription to presence information associated with the calling entity, where the presence information comprises media data for output through an output unit in the telephone terminal,
   determining, if the caller identity was determined to be associated with a subscription to presence information, whether the media data is present in the terminal, and if the media data is present in the terminal, outputting the media data through an output unit in the telephone terminal.

2. The method according to claim 1, comprising:
   fetching the media data, if the caller identity was determined to be associated with a subscription to the presence information and if the media data is not present in the terminal, from the presence information associated with the caller identity.

3. The method according to claim 1, wherein the step of determining whether the caller identity is associated with a subscription to presence information comprises communication with a presence server.

4. The method according to claim 2, wherein the step of fetching the media data comprises fetching data from the presence server.

5. The method according to claim 1, wherein the media data comprises a ring-tone.

6. A computer program loadable into memory means of a telephone terminal and when executed performing a method according to claim 1.

7. A telephone terminal comprising means for:
   detecting an incoming call from a calling entity,
   determining a caller identity of the calling entity,
   determining whether the caller identity is associated with a subscription to presence information associated with the calling entity, where the presence information comprises media data for output through an output unit in the telephone terminal,
   determining, if the caller identity was determined to be associated with a subscription to presence information, whether the media data is present in the terminal, and if the media data is present in the terminal, outputting the media data through an output unit in the telephone terminal.

8. The telephone terminal according to claim 7, further comprising means for:
   fetching the media data, if the caller identity was determined to be associated with a subscription to the presence information and if the media data is not present in the terminal, from the presence information associated with the caller identity.

* * * * *